(12) United States Patent
Schmidt

(10) Patent No.: US 11,509,187 B2
(45) Date of Patent: Nov. 22, 2022

(54) INTEGRATED TERMINAL BOX OF A ROTARY DYNAMOELECTRIC MACHINE

(71) Applicant: Siemens Aktiengesellschaft, Munich (DE)

(72) Inventor: Valerias Schmidt, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 16/767,410

(22) PCT Filed: Nov. 26, 2018

(86) PCT No.: PCT/EP2018/082510
§ 371 (c)(1),
(2) Date: May 27, 2020

(87) PCT Pub. No.: WO2019/105878
PCT Pub. Date: Jun. 6, 2019

(65) Prior Publication Data
US 2020/0389066 A1    Dec. 10, 2020

(30) Foreign Application Priority Data

Nov. 28, 2017   (EP) ..................................... 17203949

(51) Int. Cl.
*H02K 5/22*     (2006.01)
*H02K 5/15*     (2006.01)
*H02K 5/20*     (2006.01)

(52) U.S. Cl.
CPC .............. *H02K 5/225* (2013.01); *H02K 5/15* (2013.01); *H02K 5/20* (2013.01); *H02K 2205/09* (2013.01)

(58) Field of Classification Search
CPC .................................. H02K 5/15; H02K 5/225
See application file for complete search history.

(56) References Cited

U.S. PATENT DOCUMENTS

| 3,673,447 A | 6/1972 | Zumbach et al. |
| 4,399,382 A | 8/1983 | Volkrodt |
| 2004/0108779 A1* | 6/2004 | Boettger ................. H02K 5/15 310/89 |
| 2014/0050603 A1 | 2/2014 | Hoj |

(Continued)

FOREIGN PATENT DOCUMENTS

| AT | 3851 U1 | 6/2000 |
| CN | 201541167 U | 8/2010 |

(Continued)

OTHER PUBLICATIONS

DE29502565, machine translation of de29502565, Jun. 1996 (Year: 1996).*

(Continued)

*Primary Examiner* — Quyen P Leung
*Assistant Examiner* — Eric Johnson
(74) *Attorney, Agent, or Firm* — Henry M. Feiereisen LLC

(57) ABSTRACT

A rotary dynamoelectric machine includes a single- or multi-phase winding system, which is arranged in a stator and has winding connection lines which are guided into a terminal box for contacting external connection lines. The terminal box is located in a region of an end side of the stator, is recessed in a housing of the stator, and is arranged axially between the stator and an end shield.

7 Claims, 7 Drawing Sheets

(56) References Cited

U.S. PATENT DOCUMENTS

| | | | | |
|---|---|---|---|---|
| 2015/0372558 A1* | 12/2015 | Battistella | ............... | H02K 11/33 |
| | | | | 310/71 |
| 2016/0033579 A1 | 2/2016 | Lampe | | |
| 2017/0229788 A1* | 8/2017 | Takahashi | ................ | H01R 4/70 |

FOREIGN PATENT DOCUMENTS

| | | | | |
|---|---|---|---|---|
| CN | 101938186 A | 1/2011 | | |
| CN | 201918830 U | 8/2011 | | |
| CN | 201937383 U | 8/2011 | | |
| CN | 103429905 A | 12/2013 | | |
| CN | 106685127 A | 5/2017 | | |
| DE | 26 48 824 B1 | 4/1978 | | |
| DE | 29502565 U1 * | 6/1996 | ............... | H02K 9/04 |
| DE | 196 23 460 A1 | 12/1997 | | |
| EP | 2 086 091 A2 | 8/2009 | | |
| EP | 2 983 276 A1 | 2/2016 | | |
| SU | 1464250 A1 * | 3/1989 | | |

OTHER PUBLICATIONS

PCT International Search Report and Whitten Opinion of International Searching Authority dated Aug. 3, 2019 corresponding to PCT International Application No. PCT/EP2018/082510 filed Nov. 26, 2018.

* cited by examiner

INTEGRATED TERMINAL BOX OF A ROTARY DYNAMOELECTRIC MACHINE

CROSS-REFERENCES TO RELATED APPLICATIONS

This application is the U.S. National Stage of International Application No. PCT/EP2018/082510, filed Nov. 26, 2018, which designated the United States and has been published as International Publication No. WO 2019/105878 A1 and which claims the priority of European Patent Application, Serial No. 17203949.7, filed Nov. 28, 2017, pursuant to 35 U.S.C. 119(a)-(d).

BACKGROUND OF THE INVENTION

The invention relates to a rotary dynamoelectric machine comprising a single- or multi-phase winding system in a stator, wherein at least the winding connection lines thereof are guided into a terminal box where they can be contacted with external connection lines.

Rotary dynamoelectric machines are used in many areas of application. For Instance, in automotive engineering, in trainsets, in electrically powered vehicles, streetcars, mining applications and also mining trucks. A radially and axially limited installation space for the drive technology is available there. However, it must be ensured that specific maintenance work can also be carried out there in a simple manner. An additional complication is that other electric operating means add-on elements also hamper the access to maintenance work on the dynamoelectric machine. Therefore connection lines in dynamoelectric machines are to be replaced without having to laboriously dismantle the entire drive system.

Connection lines are typically positioned in radial alignment above a terminal box on the housing of the dynamoelectric machine. The disadvantage here is that a comparatively large radial installation space has to be made available in order to be able to carry out the afore-cited maintenance and connection work on the dynamoelectric machine. This reduces the compactness of the entire drive system, particularly with the afore-cited applications.

The object forming the basis of the Invention is based on creating a rotary dynamoelectric machine, which, with comparatively minimal installation space, permits maintenance and connection work on the dynamoelectric machine in an easy manner.

SUMMARY OF THE INVENTION

The solution to the set object is achieved by a rotary dynamoelectric machine with a single- or multi-phase winding system, which is arranged in a stator, wherein at least the winding connection lines thereof are guided into a terminal box where they can be contacted with external connection lines, wherein the terminal box is located in the region of the end face of the stator, is recessed into a housing of the stator and is arranged axially between the stator and an end shield.

In accordance with the invention, the terminal box, which is required for the contactability of the winding connection lines and the external connection lines, is now installed in the interior of the electric machine. In the terminal box, sensor lines can likewise be guided out of the dynamoelectric machine and stored there in order also to be able to tap data of this type easily from the motor by way of this terminal box. Furthermore, a web server can likewise also be located in this terminal box, said web server forwarding the data to higher-level control rooms or other units in a manner known per se.

An extremely compact dynamoelectric machine is now thus created which, with its installation space, above all viewed radially, from now on only has the electromagnetic base elements of the dynamoelectric machine, such as e.g. the stator possibly with the housing. Furthermore, the inventive design and arrangement of the terminal box ensures that external connection lines can be replaced without having to remove the end shield.

The terminal box is now essentially formed by a shell element in the region of the stator, the bearing shield on an end face of the shell element and a radial outer cover with respect to the motor axis. By arranging and designing the terminal box, manufacture of the entire dynamoelectric machine is now also easily simplified. Here the insulation of the winding connection lines, which are embodied as end rails and insulated and impregnated together with the soldered joints, i.e. the contacting of the end rails to the winding system.

In other words: the winding connection lines are therefore impregnated jointly with the winding. All subsequent work, such as soldering, tape insulation and the manual saturation with a resin mixture, which is typically normally to be performed with the winding connection lines, is unnecessary. This moreover reduces the error rate of the insulation between the winding connection lines and the winding connections.

Above all with a metallic embodiment of the shell element, the winding connection lines are supported by one or more insulators on the shell element. Also if the shell element is to be manufactured from an insulation part, insulators of this type are advantageous for support for mechanical reasons.

On account of the currents to be transmitted into the dynamoelectric machine, with a comparatively high power of several 100 KW, the winding connection lines are embodied as rails.

In order to simplify the design and mountability within the terminal box, the external connection lines are guided from essentially the axial direction through corresponding openings in the end shield into the terminal box and contacted there together with their respective winding connection lines. This preferably takes place by means of corresponding screw connections on correspondingly equipped insulators, which are supported against the shell element.

Compact dynamoelectric machines of this type are suited to vehicle drives of any type, such as are used in electric trains, mining trucks or E-buses. Similarly, these machines are suitable as drives of machine tools, pumps or compressors.

Air and/or liquid cooling is/are suitable as cooling concepts for these machines, the terminals (inlets and outlets) of which are optionally likewise arranged above openings in the end shield, preferably on the same side as the external connection lines. This cooling concept can also easily integrate into existing cooling concepts of the entire drive, in other words machine and converter and/or the entire system (drive and work machine).

BRIEF DESCRIPTION OF THE DRAWING

The invention and essential embodiments of the invention are explained in more detail on the basis of exemplary embodiments shown in principle, in which.

DETAILED DESCRIPTION OF PREFERRED EMBODIMENTS

Figure 1:
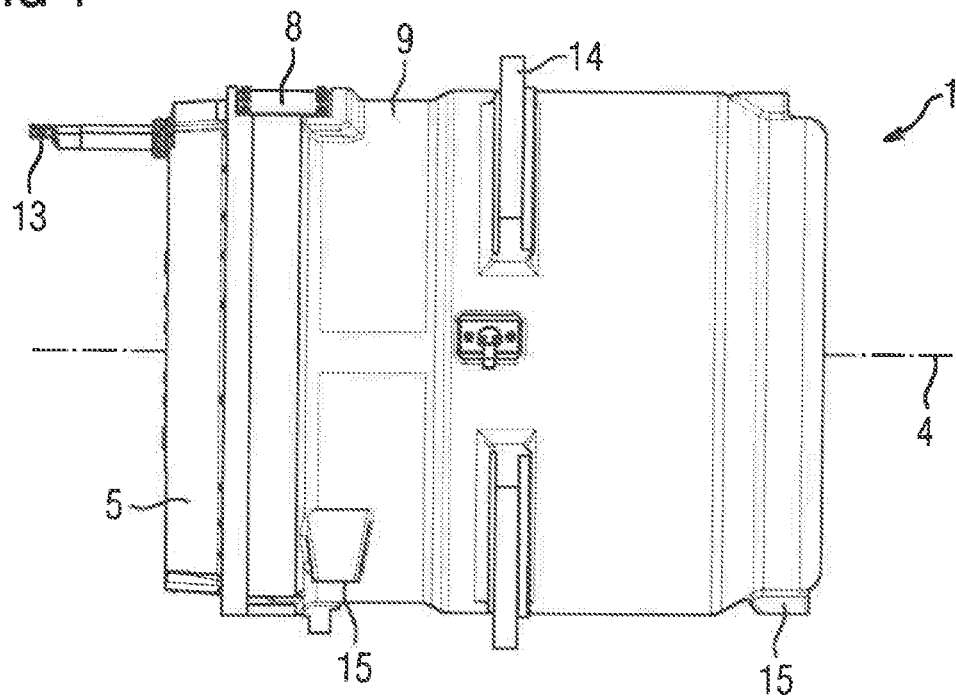
FIG. 1 shows a side view of a dynamoelectric machine.

FIG. 1 shows a front view of a dynamoelectric machine 1, the external connection lines 13 of which project in parallel to an axis 4 through an end shield 5 into the dynamoelectric machine 1. Located in sections in the central region of the housing 9 of the dynamoelectric machine 1, viewed in the peripheral direction, are flange elements 14, by means of which the machine 1 is arranged and positioned in an installation space of a vehicle or a machine tool provided therefor. Further fastening points 15 optionally allow for additional fixing points in a correspondingly configured installation space.

Figure 2:
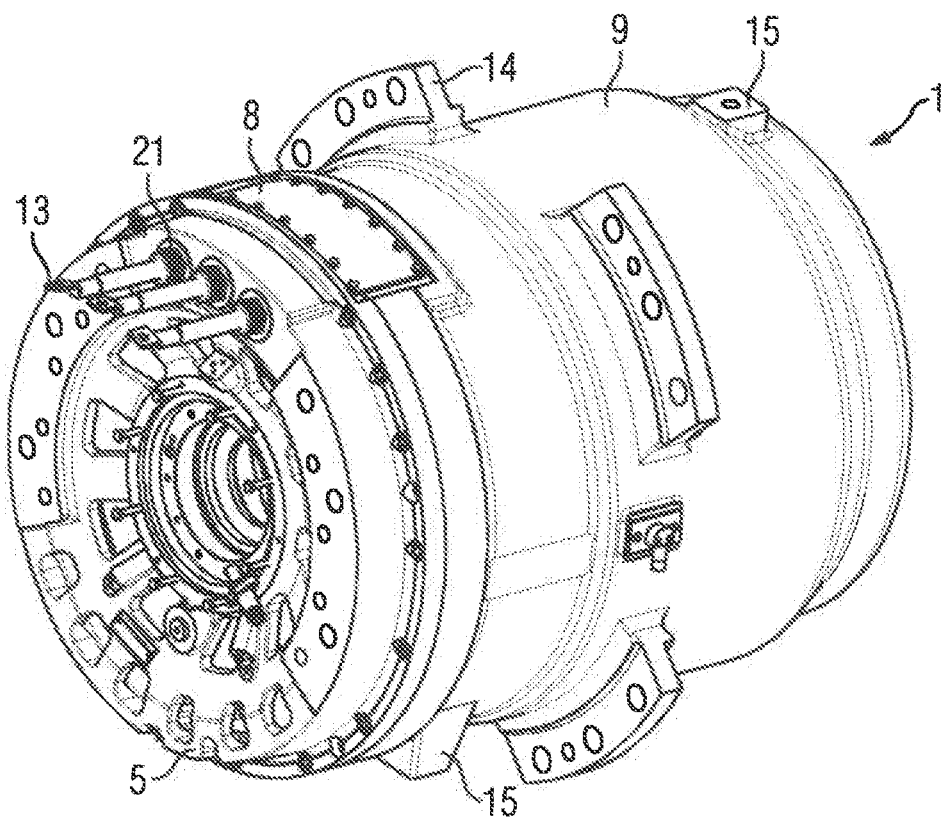
FIG. 2 shows a perspective view of the dynamoelectric machine.

FIG. 2 shows the dynamoelectric machine 1 in a perspective display, wherein this view shows a cover 8 of an internal terminal box 23 which is still not visible in this display. In this case the external connection lines 13, in this case three pieces, one connection line for each electrical phase, extend through the end shield 5.

A number of lines can optionally also be arranged per phase and/or it is likewise conceivable for data lines (not shown in more detail) to be guided axially outward out of the terminal box 23 via openings in the end shield 5.

Figure 3:
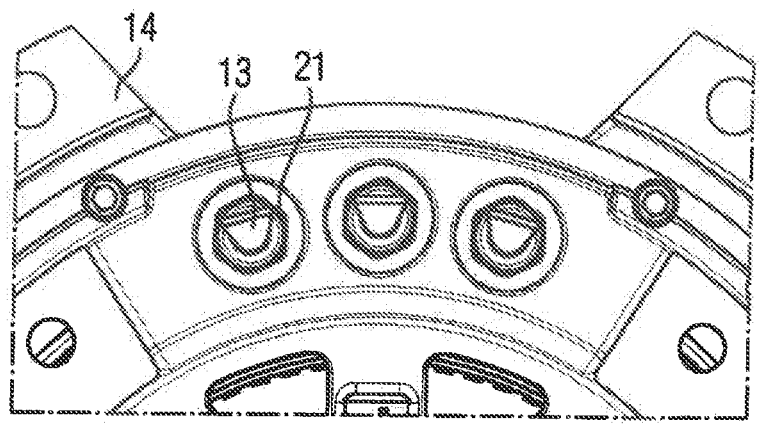
FIG. 3 shows a detailed view of the end face of the dynamoelectric machine.

FIG. 3 shows a detailed view of the region of the end shield 5, on which the connection lines 13 are embodied in an axially parallel manner and are guided through the end shield 5.

Figure 4:
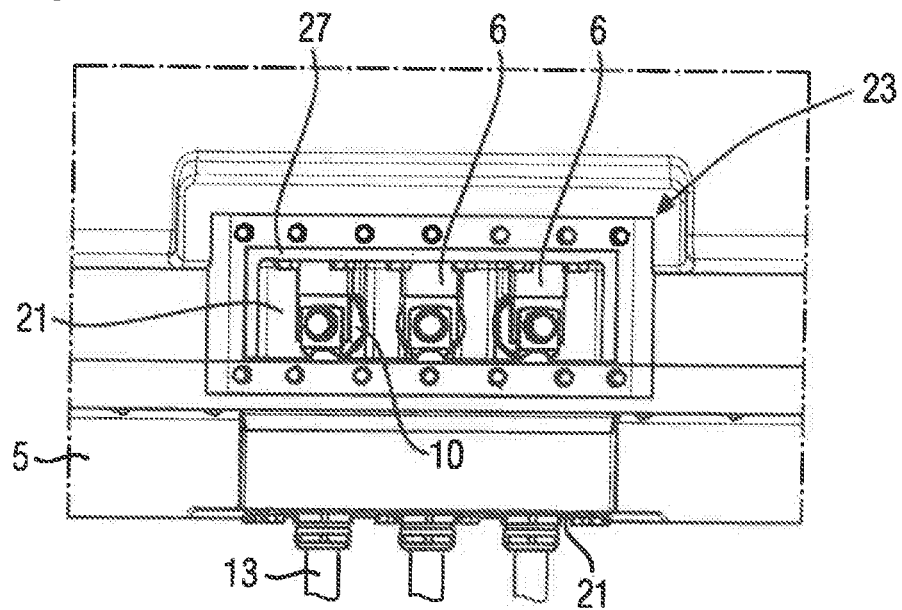
FIG. 4 shows a detailed view in the radial direction.

In a viewing direction directed radially with respect to the axis 4, FIG. 4 shows the interior of the terminal box 23 when the cover 8 is open. The terminal box 23 is formed here by a shell element 27 and the end shield 5. The winding connection lines 6 are visible from the interior of the machine 1 and are placed on an insulator 10 and can be contacted from there with the external connection lines 13.

Figure 5:
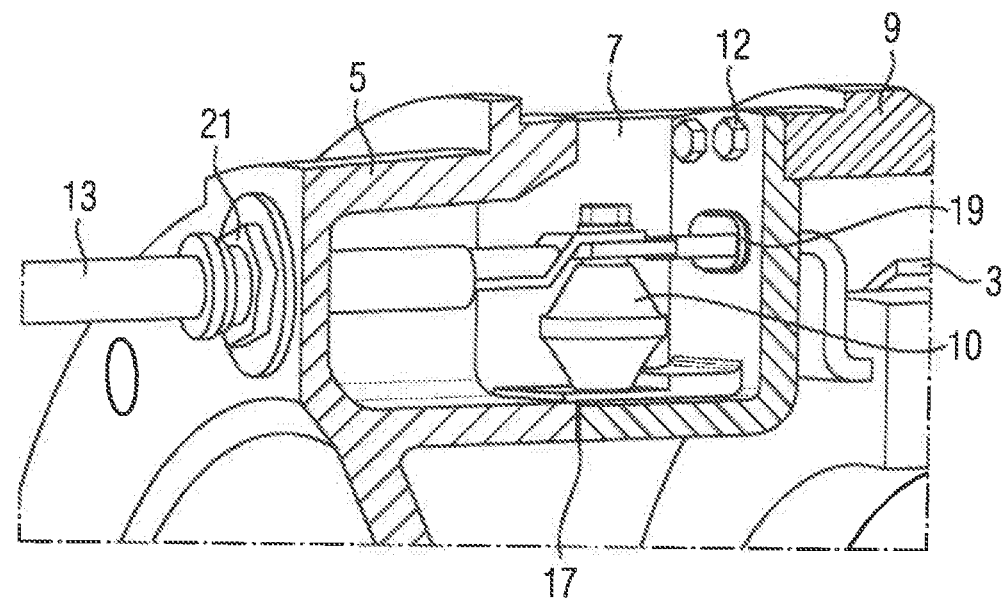
FIG. 5 shows a perspective detailed view of a sliced terminal box.
Figure 6:
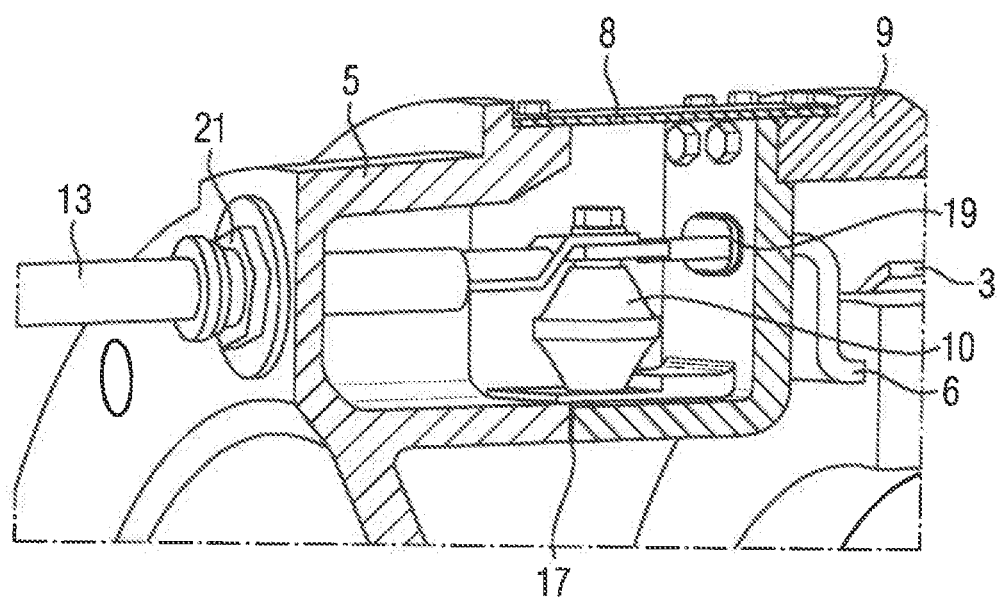
FIG. 6 shows a further detailed view of the terminal box.
Figure 7:
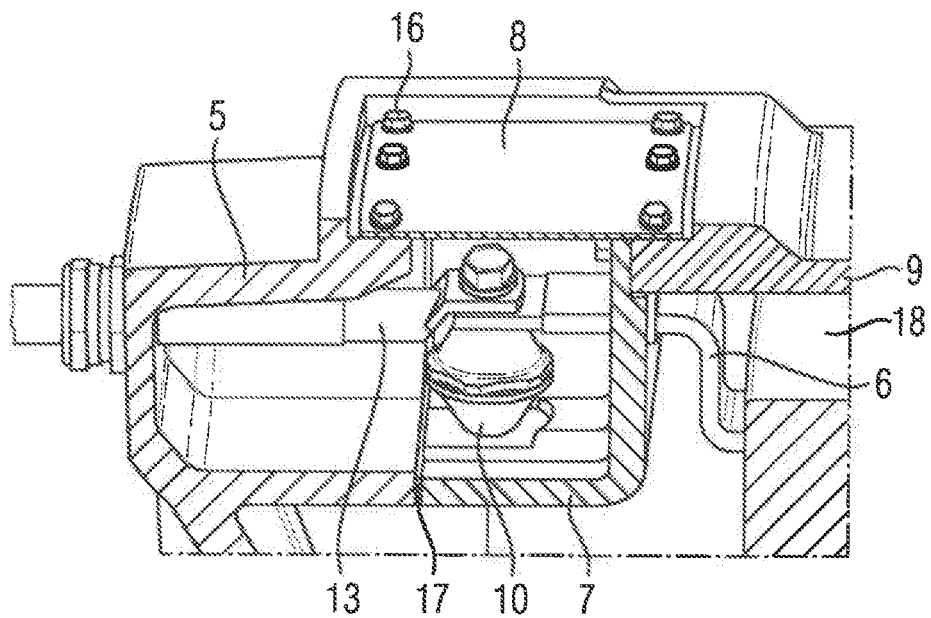
FIG. 7 shows a detailed view of the terminal box.

For the sake of clarity, only one electric phase is shown in the main displays of FIGS. 5 to 7.

FIG. 5 shows a perspective sectional view of the arrangement according to FIG. 4 for one phase, wherein the winding connection lines 6 project from the interior of the dynamoelectric machine 1 and wherein in this case the winding connection lines 6 are embodied as rails. The shell element 7 is attached and fixed here to the housing 9 of the dynamoelectric machine 1 by means of screws 12. The insulator 10 is supported against the shell element 7. Here the winding connection line 6 and the external connection line 13 and the manner in which they can be contacted on the insulator 6 are shown by way of example. This contacting is carried out by means of a screw and corresponding washers.

The terminal box 23 is formed here by the shell element 7, a cover 8 and a correspondingly configured end shield 5. Wherein the shell element 7 is held on the housing 9 by means of a corresponding fastening 12. A seal 17 is provided between the shell element 7 and end shield 5 in order to be able to operate the machine 1 also in an industrially raw environment.

FIG. 6 now shows how the cover 8 seals the interior of the terminal box 23 radially outward, in which this is fixedly screwed to the housing 9 or end shield 5 by means of corresponding screw connections.

From another perspective, FIG. 7 shows by way of example the manner in which in particular the winding connection lines 6 project from the winding head 18 of the dynamoelectric machine 1 into the terminal box 23. Here a winding head connection line 6, in this case embodied as a rail and curved into an S-shape, is guided out of the winding head 18 into the terminal box 23. The S shape is used to dampen impacts and also to comply with insulation spacings. The winding connection lines 6 are contacted, in particular soldered, within or in the region of the winding head 18 with corresponding connections of the winding.

When the shell element 7 is inserted into the housing 9 of the stator 3, existing gaps between the openings of the shell element 7 and the winding connection lines 6 are sealed. Furthermore, the axially viewed open end face of the shell element 7 is likewise sealed by the end shield 5 using a seal 17.

In accordance with the invention, a connection line 13 can now be easily replaced or new connections performed by detaching the screws of the cover 8. This is carried out without disassembling the end shield 5.

Figure 8:
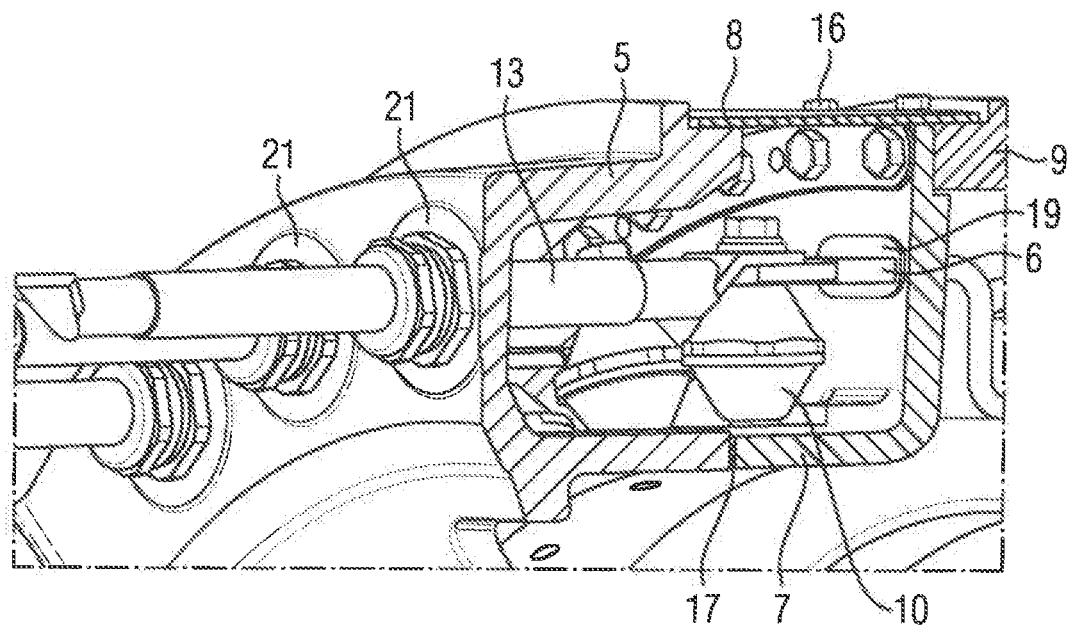
FIG. 8 shows a detailed view of the terminal box.

In a further perspective view of the terminal box 23, in FIG. 8 three connection lines 13 are guided into the terminal box 23 and are contacted there with their respective external winding connection lines 6. The contact points are in each case supported on the shell element 7 by insulators 10. A seal 17 likewise between the feedthroughs of the winding connection lines 6 on the shell element 7 is located between the end shield 5 and the shell element 7.

Figure 9:
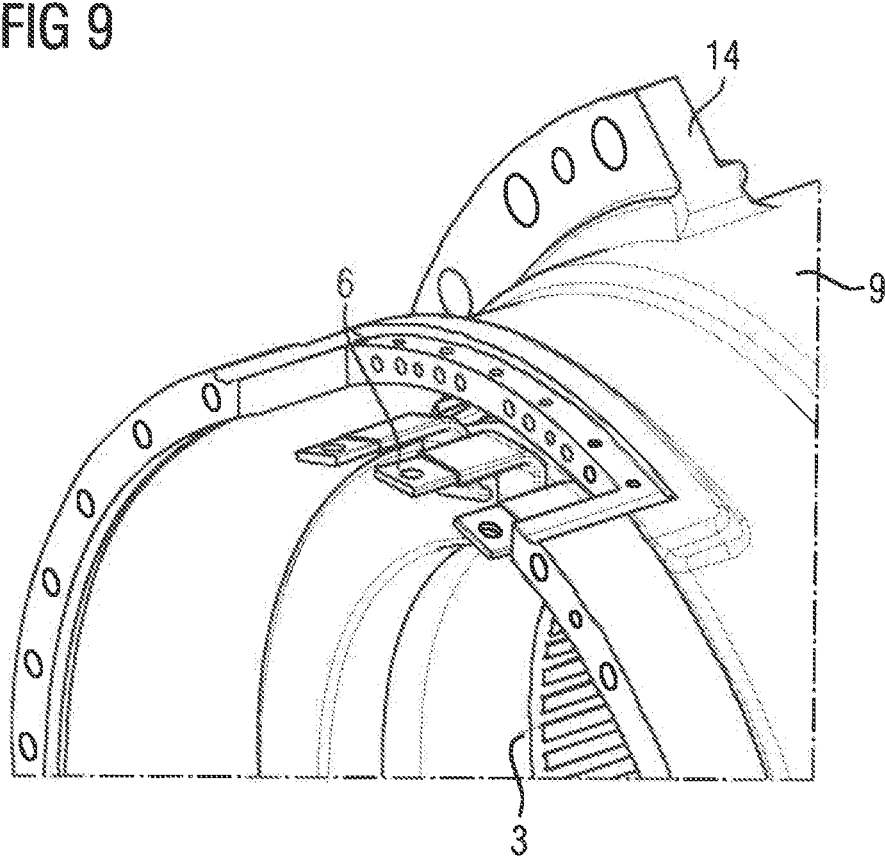
FIG. 9 shows a detailed view of the housing of the dynamoelectric machine.

In another display FIG. 9 shows the housing 9 of the dynamoelectric machine 1, in which only the winding connection lines 6 project axially out of the winding system 2 of the stator 3 of the dynamoelectic machine 1. Here a cutout into which the shell element 7 is subsequently inserted is provided in the housing 9.

Figure 10:
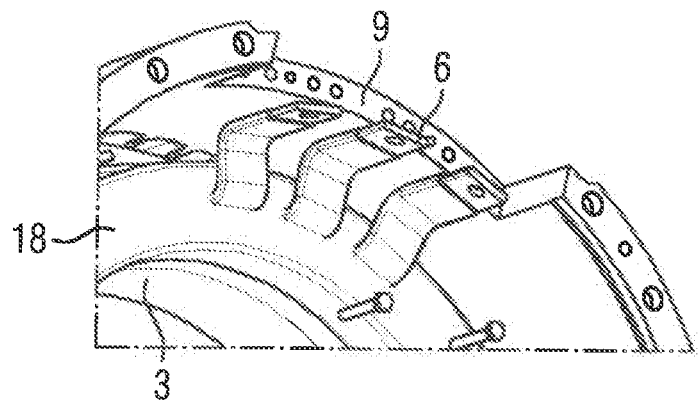
FIG. 10 shows a detailed view of the winding connection lines.

In a further display FIG. 10 shows this cutout on the housing 9 of the dynamoelectric machine 1 and the exit of the winding connection lines 6 from the winding system 2 of the stator 3.

Figure 11:
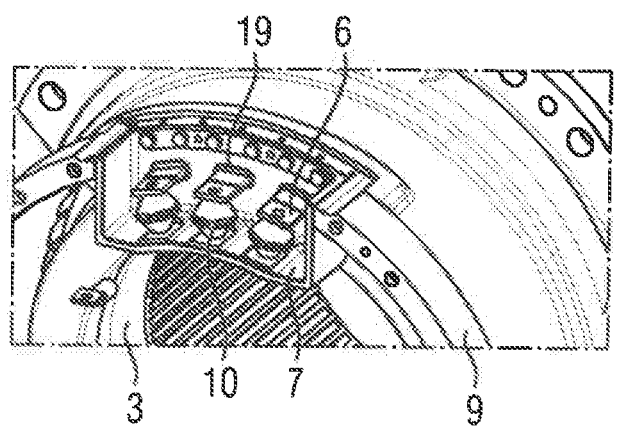
FIG. 11 shows a display of the half shell on the housing.

In a next step of assembling of the terminal box 23 FIG. 11 shows the insertion of the shell element 7 into the cutout on the housing 9 and its fastening to the housing 9 by means of screws 20. The winding connection lines 6 are guided through feedthroughs 19 in the shell element 7 to the insulators 10.

Figure 12:
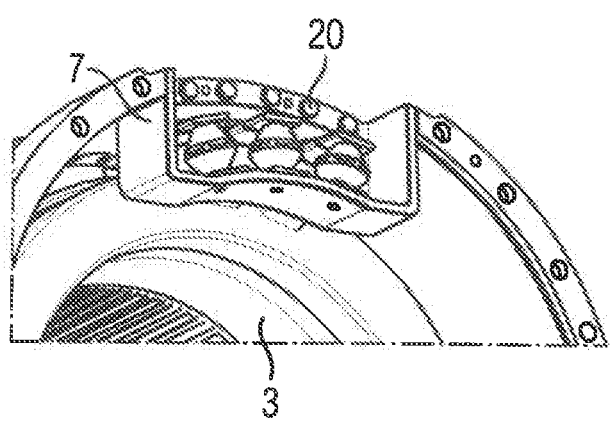
FIG. 12 shows a further display of the half shell on the housing.

In a further display FIG. 12 shows how the shell element 7 adjusts to the stator borehole or the external diameter of the housing 9 with respect to its outer and inner design. This results in a compact design of the machine 1 while complying with the requisite distances from a rotor.

Figure 13:
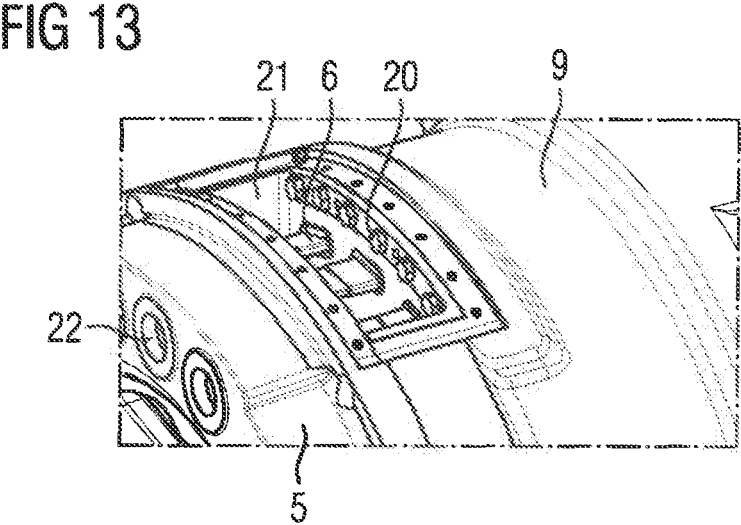
FIG. 13 shows a display of the half shell with an attached end shield.
Figure 14:
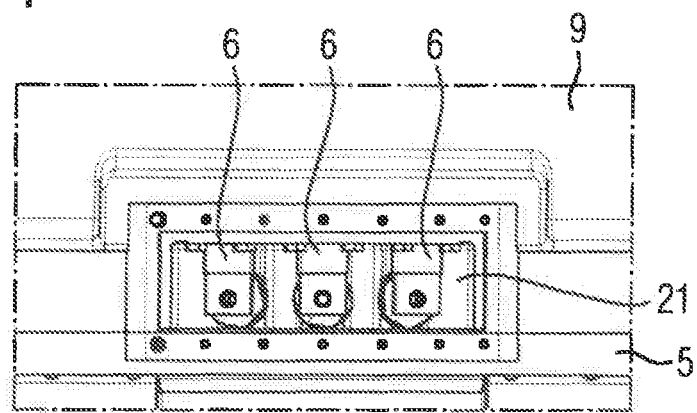
FIG. 14 shows a radial view of the half shell without external connection lines.

FIG. 13 shows in an assembled state the open terminal box 23, i.e. the end shield 5 is now added and has been attached axially to the shell element 7 or housing 9. It now represents a radial opening 21 of the terminal box 23, by way of which, in a simple manner according to FIG. 14, viewed radially, external connection lines 13 can be inserted axially into the end shield 5 by way of openings 22 and can be contacted with the winding connection lines 6 by way of the radial opening 21.

Compact dynamoelectric machines 1 of this type are suited to vehicle drives of any type, such as are used in electric trains, mining trucks or E-buses. Similarly, these machines 1 are suitable as drives of machine tools.

Here these compact dynamoelectric machines 1 are integrated into the respective cooling concepts of an entire drive, in other words machine 1 and converter (not shown in more detail) and/or an entire system with drive and drive machine.

The invention claimed is:

1. A rotary dynamoelectric machine, comprising:
   a stator having an end face;
   a housing surrounding the stator and having a cutout with an axial depth extending between an end face of the housing and the end face of the stator and with a circumferential width;
   a terminal box formed separately from the housing and shaped as a shell element having two sidewalls spaced apart to fit inside the circumferential width, a bottom connecting the two sidewalls, a backwall disposed between the two sidewalls and the bottom, and an open front, said terminal box arranged in the cutout in a region of the end face of the housing between the end face of the stator and the end face of the housing;
   an end shield attached to the end face of the housing and having a seal disposed between the open front of the shell element and the end shield;
   a single-phase winding or multi-phase winding system arranged in the stator and including winding connection lines which are guided into the terminal box through the backwall for contacting external connection lines from an essentially axial direction;
   an outer cover having a length corresponding to the circumferential width of the cutout and a width corresponding to the axial depth of the cutout, said outer cover attached over a peripheral surface of the cutout so as to seal an interior of the terminal box.

2. The rotary dynamoelectric machine of claim 1, further comprising an insulator, said winding connection lines of the winding system being supported on the shell element by the insulator.

3. The rotary dynamoelectric machine of claim 1, wherein the winding connection ones of the winding system are sized to extend to the terminal box and embodied as rails.

4. The rotary dynamoelectric machine of claim 1, wherein the external connection lines are guided axially into the terminal box.

5. The rotary dynamoelectric machine of claim 1, wherein the external connection lines are guided axially into the terminal box through the end shield.

6. The rotary dynamoelectric machine of claim 1, constructed in the form of an enclosed-ventilated machine or a dynamoelectric machine provided with an inner cooling circuit, said end shield having openings for passage of a coolant of the inner cooling circuit.

7. The rotary dynamoelectric machine of claim 1, for use in a vehicle drive in a mining application and electric railways and for use in the machine tool industry.

* * * * *